United States Patent
Kemp, II et al.

(10) Patent No.: US 8,589,948 B2
(45) Date of Patent: *Nov. 19, 2013

(54) METHOD AND APPARATUS FOR MESSAGE FLOW AND TRANSACTION QUEUE MANAGEMENT

(75) Inventors: Gary Allen Kemp, II, Winnetka, IL (US); Jens-Uwe Schluetter, Evanston, IL (US); David Garrison, Arlington Heights, IL (US); Sagy Mintz, Lincolnshire, IL (US)

(73) Assignee: Trading Technologies International Inc., Chicago, IL (US)

( * ) Notice: Subject to any disclaimer, the term of this patent is extended or adjusted under 35 U.S.C. 154(b) by 374 days.

This patent is subject to a terminal disclaimer.

(21) Appl. No.: 11/417,513

(22) Filed: May 3, 2006

(65) Prior Publication Data

US 2010/0318673 A1 Dec. 16, 2010

Related U.S. Application Data

(63) Continuation of application No. 10/196,056, filed on Jul. 15, 2002, now Pat. No. 7,124,110.

(51) Int. Cl.
*G06F 7/00* (2006.01)
(52) U.S. Cl.
USPC ............ 719/314; 705/1.1; 705/7.11; 705/16; 705/21; 705/35
(58) Field of Classification Search
None
See application file for complete search history.

(56) References Cited

U.S. PATENT DOCUMENTS

| | | | | |
|---|---|---|---|---|
| 4,412,287 A | * | 10/1983 | Braddock, III | 705/37 |
| 4,677,552 A | * | 6/1987 | Sibley, Jr. | 705/37 |
| 4,692,600 A | | 9/1987 | Takahashi | |
| 4,740,958 A | | 4/1988 | Duxbury et al. | |
| 4,903,201 A | | 2/1990 | Wagner | |
| 4,980,826 A | * | 12/1990 | Wagner | 705/37 |

(Continued)

FOREIGN PATENT DOCUMENTS

| | | | |
|---|---|---|---|
| WO | WO 99/27476 | 3/1999 | |
| WO | WO 01/77957 | 10/2001 | |
| WO | WO 02/50747 | 6/2002 | G06F 17/60 |

OTHER PUBLICATIONS

"iWay Intelligent Adapter for SWIFT" product literature, iWay Software, Printed Feb. 24, 2003.

(Continued)

*Primary Examiner* — Andy Ho
*Assistant Examiner* — Shih-Wei Kraft
(74) *Attorney, Agent, or Firm* — McDonnell Boehnen Hulbert & Berghoff LLP

(57) ABSTRACT

Management of transaction message flow utilizing a transaction message queue. The system and method are for use in financial transaction messaging systems. The system is designed to enable an administrator to monitor, distribute, control and receive alerts on the use and status of limited network and exchange resources. Users are grouped in a hierarchical manner, preferably including user level and group level, as well as possible additional levels such as account, tradable object, membership, and gateway levels. The message thresholds may be specified for each level to ensure that transmission of a given transaction does not exceed the number of messages permitted for the user, group, account, etc.

20 Claims, 6 Drawing Sheets

(56) References Cited

U.S. PATENT DOCUMENTS

| | | | |
|---|---|---|---|
| 4,995,056 A | | 2/1991 | Fogg, Jr. et al. |
| 5,077,665 A | * | 12/1991 | Silverman et al. ............ 705/37 |
| 5,297,031 A | * | 3/1994 | Gutterman et al. ............ 705/37 |
| 5,297,032 A | * | 3/1994 | Trojan et al. .................... 705/37 |
| 5,604,866 A | | 2/1997 | Kolb et al. |
| 5,727,165 A | * | 3/1998 | Ordish et al. .................. 705/37 |
| 5,790,642 A | | 8/1998 | Taylor et al. |
| 5,826,244 A | | 10/1998 | Huberman |
| 5,911,137 A | * | 6/1999 | Lin et al. ........................ 705/37 |
| 5,916,307 A | | 6/1999 | Piskiel et al. ................. 709/300 |
| 5,953,708 A | | 9/1999 | Midorikawa et al. .......... 705/26 |
| 6,039,245 A | | 3/2000 | Symonds et al. |
| 6,058,389 A | | 5/2000 | Chandra et al. .................. 707/1 |
| 6,167,445 A | * | 12/2000 | Gai et al. ...................... 709/223 |
| 6,192,029 B1 | | 2/2001 | Averbuch et al. |
| 6,269,399 B1 | | 7/2001 | Dyson et al. .................. 709/224 |
| 6,311,144 B1 | * | 10/2001 | Abu El Ata ........................ 703/2 |
| 6,338,047 B1 | | 1/2002 | Wallman |
| 6,343,278 B1 | * | 1/2002 | Jain et al. .................... 705/36 R |
| 6,421,653 B1 | | 7/2002 | May |
| 6,606,607 B1 | | 8/2003 | Martin et al. |
| 7,124,110 B1 | * | 10/2006 | Kemp et al. ..................... 705/37 |
| 7,130,824 B1 | * | 10/2006 | Amanat et al. .................. 705/37 |
| 7,318,045 B2 | * | 1/2008 | Baecker et al. ................. 705/37 |
| 7,552,077 B1 | | 6/2009 | Schluetter et al. |
| 7,562,044 B1 | * | 7/2009 | Tenorio ........................... 705/37 |
| 7,797,207 B1 | * | 9/2010 | Dilip et al. ...................... 705/35 |
| 2001/0041579 A1 | | 11/2001 | Smith et al. |
| 2001/0042040 A1 | * | 11/2001 | Keith ............................... 705/37 |
| 2001/0042041 A1 | * | 11/2001 | Moshal et al. ................. 705/37 |
| 2001/0044767 A1 | * | 11/2001 | Madoff et al. ................. 705/37 |
| 2001/0049649 A1 | * | 12/2001 | Baecker et al. ................. 705/37 |
| 2002/0013753 A1 | * | 1/2002 | Marks de Chabris et al. .. 705/36 |
| 2002/0019795 A1 | * | 2/2002 | Madoff et al. .................. 705/37 |
| 2002/0082967 A1 | * | 6/2002 | Kaminsky et al. .............. 705/37 |
| 2002/0095369 A1 | * | 7/2002 | Kaplan et al. ................... 705/37 |
| 2002/0111922 A1 | * | 8/2002 | Young et al. .................... 705/80 |
| 2002/0138399 A1 | * | 9/2002 | Hayes et al. .................... 705/37 |
| 2002/0143981 A1 | * | 10/2002 | DeLima et al. ............... 709/233 |
| 2003/0004859 A1 | * | 1/2003 | Shaw et al. ..................... 705/37 |
| 2003/0083977 A1 | * | 5/2003 | Syed ............................... 705/37 |

OTHER PUBLICATIONS

"Financial Messaging Middleware," Solid Data, wysiwyg://310/ http://www.soliddata.com/company/broker_case.html, printed Jul. 11, 2002.

"Bristol Releases Enterprise Transaction Monitor," Midrange Stuff, http://www.midrangeserver.com/mso021902-story04.html, printed Feb. 19, 2002.

Supplementary European Search Report EP 03 76 4538.

Bradshaw et al., "Oracle 9i Application Developer's Guide-Advance Queuing, Release 2 (9.2)," Oracle Corporation, Retrieved from Internet: URL:http://www.oracle.com, pp. I-XXII, 1.1-1.28, 7.1-7.16, 18-1-18.48 (Mar. 2002).

Rachlevsky-Reich, "GEM: A Global Electronic Market System," Retrieved from Internet: URL:http//citeseer.ist.psu.edu/rd/8069148, pp. 1-125 (Jul. 1999).

Steiert et al., "JPMQ-an advanced persistent message queuing service," Advances in Databases. British National Conference on Databases, pp. 1-18 (Jul. 1998).

Rachlevsky-Reich, Benny et al., GEM: A Global Electronic Market System, Information Systems, vol. 24, No. 6, pp. 495-518, 1999.

International Search Report for International Application PCT/US03/21776 dated Sep. 5, 2003.

* cited by examiner

EXCHANGE: EXCH-1 ADDRESS 172.17.19.11 STATUS: ACTIVE

| MEMBER | GROUP | TRADER | OBJ. TYPE | TRDBL OBJ. | GATEWAY LIMIT | MBR LIMIT | GROUP LIMIT | TRDR LIMIT | GW T/O | MBR T/O | TRDR FLOOR | TRDR FACTOR |
|---|---|---|---|---|---|---|---|---|---|---|---|---|
| TTMBR | GRP-1 | TRD |  |  | 15 | 5 |  | 1 | 6 |  |  |  |
| TT-TST | GRP-1 | OO1 |  |  | 15 |  |  | 5 | 6 |  |  |  |
| TTMBR | GRP-2 | TRD |  |  | 15 | 5 |  | 2 | 6 | 2 |  |  |
| TTSIM | SIM | OO1 | FUTURE | FDAX | 15 | 10 | 8 | 6 | 6 | 5 | 200 | 10 |
| TTSIM | SIM | OO1 | FUTURE | FESX | 15 | 10 | 8 | 6 | 6 | 5 | 100 | 5 |
| TTSIM | SIM | OO1 | FUTURE | FGBL | 15 | 10 | 8 | 6 | 6 | 5 | 100 | 5 |
| TTSIM | SIM | OO2 |  |  | 15 | 10 | 8 | 3 | 6 | 5 |  |  |
| TTSIM | SMA | OO1 |  |  | 15 | 10 | 6 | 4 | 6 | 5 |  |  |
| TTSIM | SMO | OO1 |  |  | 15 | 10 |  | 7 | 6 |  |  |  |
| TTTRN |  |  |  |  | 15 | 5 |  |  | 6 |  |  |  |

| GATEWAY STATUS | | | | | | | | |
|---|---|---|---|---|---|---|---|---|
| EXCHANGE | IP ADDRESS | CURRENT QUEUED | TOTAL QUEUED | MAX QUEUED | CURRENT IN-FLIGHT | TOTAL TRANS | MAX IN-FLIGHT | IN FLIGHT ALARM |
| EXCH-1 | 172.17.19.11 | 0 | 5 | 1 | 0 | 127 | 5 | 2 |
| EXCH-2 | 172.18.20.11 | 1 | 3 | 2 | 1 | 89 | 5 | 2 |

Figure 4B

| TRADER STATUS | | | | | | | | | | |
|---|---|---|---|---|---|---|---|---|---|---|
| EXCHANGE | IP ADDRESS | MEMBER | GROUP | TRADER | CURRENT QUEUED | TOTAL QUEUED | MAX QUEUE | CURRENT IN-FLIGHT | TOTAL TRANS | MAX IN-FLIGHT |
| EXCH 1 | 172.17.19.11 | TTSIM | SIM | 001 | 0 | 0 | 0 | 0 | 0 | 0 |
| EXCH 1 | 172.17.19.11 | TTMBR | GRP-1 | TRD | 0 | 6 | 2 | 2 | 72 | 5 |
| EXCH 2 | 172.18.20.11 | TT-CME | GRP-1 | TRD1 | 0 | 0 | 0 | 0 | 12 | 3 |

Figure 4C

| TRADABLE OBJECT STATUS | | | | | | | | | | | |
|---|---|---|---|---|---|---|---|---|---|---|---|
| EXCHANGE | IP ADDRESS | MEMBER | GROUP | TRADER | OBJECT TYPE | TRDBL OBJECT | TOTAL FILLS | TOTAL RATIO | TRDR TRANS | TRDR FILLS | |
| EXCHANGE 1 | 172.17.19.11 | TTSIM | SIM | 001 | FUTURE | FDAX | 0 | 0 | 0 | 0 | |
| EXCHANGE 1 | 172.17.19.11 | TTSIM | SMA | 001 | FUTURE | FESX | 0 | 0 | 0 | 0 | |
| EXCHANGE 2 | 172.18.20.11 | TT-CME | GRP-1 | TRD1 | FUTURE | FGBL | 0 | 0 | 0 | 0 | |

Figure 4D

METHOD AND APPARATUS FOR MESSAGE FLOW AND TRANSACTION QUEUE MANAGEMENT

CROSS-REFERENCE TO RELATED APPLICATIONS

This application is a continuation of U.S. patent application Ser. No. 10/196,056, filed Jul. 15, 2002 now U.S. Pat. No. 7,124,110 in the name of Kemp et al., entitled "Method and Apparatus for Message Flow and Transaction Queue Management," now U.S. Pat. No. 7,124,110.

FIELD OF THE INVENTION

The present invention relates generally to the field of financial systems and financial transaction messaging. More particularly, the present invention relates to a method and apparatus for managing a financial transaction message queue.

BACKGROUND OF THE INVENTION

At the most general level, a trading entity is any entity with a membership to an exchange, or an entity that shares a membership in some manner. Trading entities may be a trading house, an individual trader, or one or more groups of traders sharing a membership and otherwise sharing certain resources. Generally speaking then, a trading entity may be an individual trader or group of traders that desire to access markets and engage in market transactions via an exchange.

An electronic exchange typically provides a matching process between traders—buyers and sellers. Typical exchanges are EUREX®, LIFFE®, EURONEXT®, CME®, CBOT®, XETRA® and ISLAND®. Trading entities are typically connected to an electronic exchange by way of a communication link to facilitate electronic messaging between the trading entities and the exchange. The messaging may include orders, quotes (which are essentially two-sided orders), acknowledgements, fills, cancels, deletes, cancel and replace, and other well-known financial transaction messages.

The communication link may utilize numerous telecommunication technologies, including frame relay, X.25, DS-0, T-1, T-3, DS-3 (45 Mb), multiple DS-3 connections, DSL, cable or analog phone lines. The communications links are preferably provided by tier 1 telecom providers and DS-3 ATM connections. The message format and messaging protocols are specific to the particular exchange, and can utilize any protocol. Many exchanges conform to the TCP/IP protocol suite for the transport and network layers. Typically, the exchange provides a standardized communication interface to which the member may connect a workstation, or more typically, a computer network gateway device, through which a number of users may communicate with the exchange.

Many exchanges impose limits or restrictions on the communication messages received from their members or member firms. The limits are generally intended to ensure that the exchange computer system is not overburdened, and to dissuade members from submitting excessive or unnecessary messages. Limits may be enforced in various manners. For example, some limits may be enforced by the exchange queuing (or delaying) transaction messages once a limit has been reached. Another example involves an exchange charging fees or penalties for transaction messages once a limit has been reached. For example, the limits may include a cap on the number of "in-flight" transactions. In-flight transactions are those transactions that have been submitted to the exchange for which the exchange has not provided a return confirmation of receipt.

A further type of limit may be on the number of transactions submitted by a member in a given time period. Orders and quotes indicate a willingness to buy and/or sell, and are often revised and resubmitted by traders to reflect changes in their desired positions. Traders may revise their transactions to reflect even small changes in the market, and when prices in the market move rapidly, this may result in large numbers of transactions being submitted to the exchange. Excessive quoting (which refers to any type of transaction including orders and quotes) can place a burden on the exchange.

Another type of limit that is often imposed by exchanges is the overall aggregate measure of message traffic as measured in bytes in a given period of time. This is commonly referred to as data transmission rate, or bandwidth usage. This limit may simply be a result of the physical limitation imposed by the particular communication link, or it may be a measured quantity.

With the increased use of automated trading tools, reaching or exceeding these limits (e.g., five in-flight transactions on the Chicago Mercantile Exchange, or CME®) may occur rather easily. Indeed, the use of such tools can easily overburden an exchange's message handling capacity. As such, some exchanges require the use of software at gateways that prevents the message traffic from exceeding specified limits. Some exchanges even provide the software utilities for gateways that connect a member to the exchange. Two example consequences of poor transaction messaging resource use are end user experience delay decay and transaction costs.

Currently, gateway owners don't have the ability to control how the limited messaging resources are distributed among the various users that share the gateway. Thus, software that limits the message traffic without regard to the individual trading entities that may be sharing the communication link has the potential to result in a single user or group of users tying up most or all communications to an exchange. Thus, there is a need to more precisely control the transaction message traffic in view of the limited resources available.

BRIEF DESCRIPTION OF THE DRAWINGS

Exemplary embodiments of the present invention are described with reference to the following drawings, in which:

FIGS. 4A through 4D is a preferred embodiment of displaying transaction messaging resource allocations.

DETAILED DESCRIPTION OF THE PREFERRED EMBODIMENT(S)

A method and system for managing transaction message flow utilizing a transaction message queue is provided. The system and method are for use in financial transaction messaging systems. The system is designed to enable an administrator to monitor, distribute, control and receive alerts on the use and status of limited network and exchange resources. The system preferably runs on a communication gateway between users' trading workstations and a communications interface to a trading exchange (e.g., CBOT®, CME®, EUREX®, etc.). The gateway may reside on the trading workstations, or it may be located on a separate physical device on a computer network. Similarly, a single physical device may provide more than one instantiation of a gateway. The system tracks message flow and system usage parameters to ensure the amount of message traffic does not exceed predetermined message thresholds.

The preferred embodiments are directed to a system and method for use in financial transaction messaging systems, particularly with respect to transaction messages. The term "transaction messages" refers to any number of different types of messages, including orders, quotes, acknowledgements, fills, cancels, deletes, cancel and replace, and other well-known financial transaction messages. The system is preferably configured to manage any and all transaction messages. The system preferably acts to throttle transaction message flow from different traders based on various limits. Thus, in one preferred embodiment, the system manages transaction messages originating from an automated trading system (which is capable of generating numerous transactions at a high rate) as well as manually generated messages (e.g., specific order or quote messages resulting from direct user interaction with a trading software interface).

In alternative embodiments, the system may be used to regulate only those messages generated by an automated trading program operating on a trading workstation, and manually generated messages will not be subject to the limit thresholds, and such messages will not be queued in the transaction message queue of a present embodiment (the message may still be queued in the exchange queue). The term workstation as used herein can include any computing device, including a personal computer, a handheld device, etc. Preferably the system is configurable so the administrator can select whether or not to exempt manually generated transactions.

Figure 1:
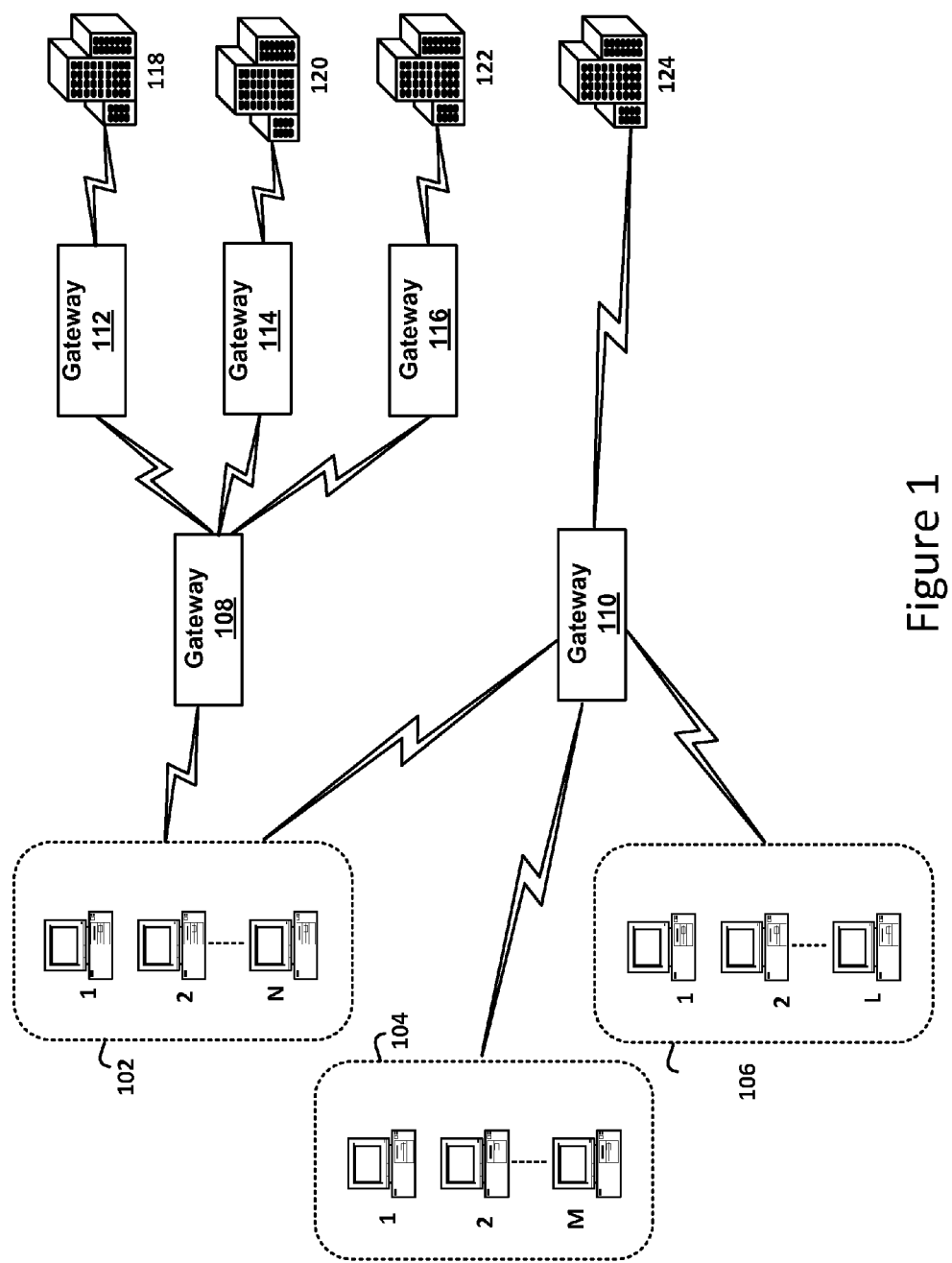
FIG. 1 is an example network configuration for a communication system utilised to access one or more exchanges.

FIG. 1 shows an example system for managing transaction message flow. Generally, the system, as shown, includes trading houses 102-106 that are connected to exchanges 118-124 through one or more gateways 108-116. Each trading house 102-106 has one or more trading workstations. For example, trading house 102 can have up to N workstations, whereas trading houses 104 and 106 can support up to M and L workstations, respectively (where N, M and L can be any number). Although not shown for clarity, individual traders or one or more groups of traders may also be included in the system, in which each trader or group of traders would connect to the exchange in a similar fashion as the trading houses.

The system shows two possible configurations, although any number of configurations is possible. In one configuration, trading house 102 is connected to gateway 108 that communicates with exchanges 118-122 through gateways 112-116. The assignee of the present application sells one such gateway, referred to as TT Relay™, that connects to multiple gateways. Additionally, trading house 102 communicates with exchange 124 through gateway 110. According to this configuration, the trading house 102 communicates with the exchange through more than one gateway. Of course, more network devices such as routers may exist along the path between the trading house 102 and exchanges 118-124. In another configuration, trading houses 104, 106 are connected to exchange 124 through gateway 110. According to this second configuration, the trading house communicates with the exchange through one gateway. As with the first configuration, more network devices may exist along the path between the trading houses and exchanges. It should also be understood that there are many possible variations beside the system shown in the Figure. For example, gateway 110 may connect with gateways 112-116 so that trading houses 104, 106 can connect with exchanges 118-122. Moreover, the gateway(s) may reside on the trading workstations, or it may be located on a separate physical device on a computer network. Similarly, a single physical device may provide more than one instantiation of a gateway.

One or more groups of traders may exist within each trading house. The number or type of groups may depend on the trading house itself. For example, sometimes when a trading house divides its traders into one or more groups, it may be done for organizational reasons, or any other reason the house may have. Traders may be grouped in additional ways such as by their workstations, the tradable objects that they trade, or even by the trading house. There are many ways to group the traders, from an exchange perspective or a trading house perspective, in a hierarchical manner. Based on the hierarchical manner, which can be programmed in any way, the system tracks message flow and system usage parameters to ensure the amount of message traffic does not exceed predetermined message thresholds.

Traders and related objects are preferably grouped in a hierarchical manner, including a user level and group level, as well as possible additional levels such as tradable object, software tool or application, account, membership, and gateway levels. Each level can have one or more elements. In one embodiment, these elements could include particular members, particular trader groups, particular traders (identified by trader IDs), particular accounts, particular tradable objects, particular types of tradable objects, particular classes of tradable objects, and particular software trading applications. An "entity" may be defined as including a single element, a single level or any combination of elements or levels from the hierarchical structure. The transaction message thresholds may be specified for any entity to ensure that transmission of a given transaction does not exceed the number of messages permitted.

Limits for any entity may include, but are not limited to, such things as the number of transaction messages per second (e.g., using a "sliding window" to count messages transmitted with the last second), the total number of transaction messages for the day, the number of transactions that are "in-flight" (transactions submitted to an exchange that have not yet been acknowledged by the exchange), the number of data bytes per second or the total number of bytes for the day. Limits may be selected so as to divide limited resources in a controlled fashion in order to increase productivity and profits. Each user is preferably categorized to belong to various entities. Thus, each user preferably has its own set of parameters that make up its limit use profile, and the profile parameters correspond to multiple entities or levels. The thresholds may be set manually by an administrator, or may be automatically set and/or adjusted. Automatic adjustment may be based on the number of fills (e.g., transactions to fills ratio—this may be used to increase the total number of transactions permitted per day), a given user's profit or other measure of success (this may be used to increase any of the limits), a measure of bandwidth utilization or other criteria.

In the event that transmission of a given transaction message to the exchange would exceed a threshold limit, the message is preferably placed in a transaction message queue until it may be transmitted without exceeding a threshold limit. The system automatically updates the queue when related transaction messages are received from the trading workstation(s), or when other limiting events occur. The transaction message queue may also automatically drop or reject messages if they remain in the queue for a predetermined length of time. The transaction message queue (or other component of the gateway) may further notify a user that a message is going to be, or has been, dropped or rejected.

The system preferably notifies an administrator (by email or other suitable messaging system, including instant messaging or paging and/or on-screen message) in the event of limits being enforced resulting in queuing of transaction messages. In addition, the system preferably highlights the effected user(s) on the monitor screen.

Figure 2:
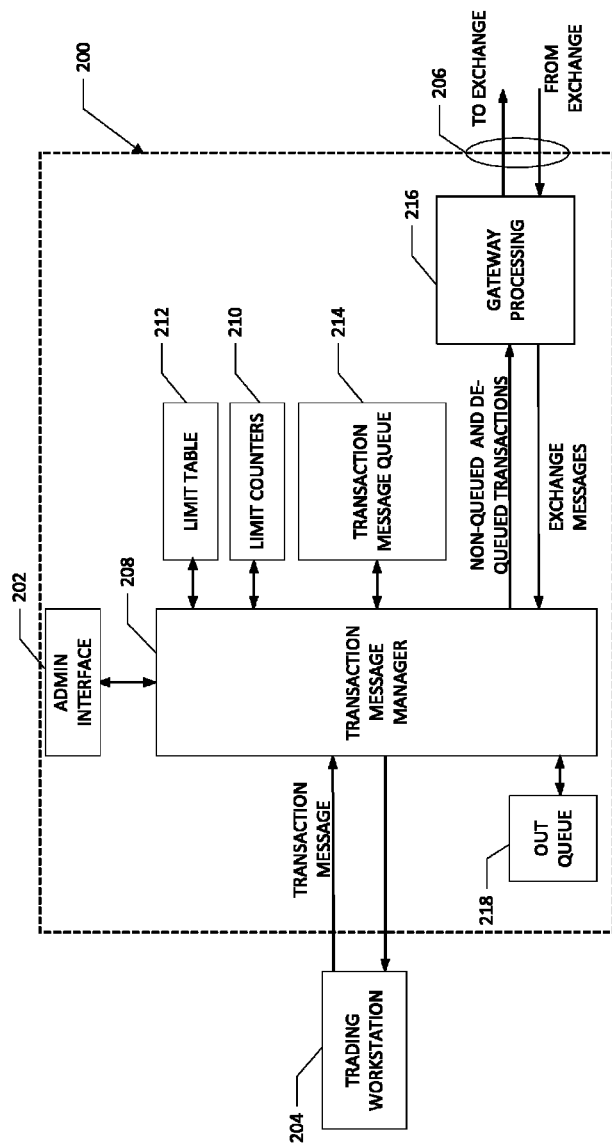
FIG. 2 is a preferred embodiment of a financial transaction message management system.

With reference to FIG. 2, a preferred embodiment of the transaction message management system, or gateway 200, will be described. Gateway 200 is preferably implemented on any one of the gateways illustrated in FIG. 1. The gateway 200 allows an administrator, via administrator interface 202 to monitor, distribute, control and receive alerts on the use and status of limited network and exchange resources. The gateway 200 acts as a communication gateway between users' trading workstations 204 and a communications interface 206 to a trading exchange (e.g., CBOT®, CME®, EUREX®, etc.).

The gateway 200 may reside on the same physical computing platform as the trading workstations 204, or it may be located on a separate physical device on a computer network. The gateway 200 may also be distributed across multiple devices. The physical computing device of the gateway 200 may also implement such functions as a router, firewall, or other common network infrastructure component. In addition, a single physical device may provide more than one instantiation of a gateway 200. The connections to trading workstations may be through a wired or wireless LAN, WAN, or other suitable connection medium.

There can also be an API (applications programming interface) between the trading workstation 204 and the gateway 200. The gateway 200 can be any network device disposed in the communication path between trading workstations and an exchange. In addition, the functionality of the gateway 200 may be implemented at an exchange.

Similarly, the administrator interface may reside on the same physical computing device as the gateway 200, or may be a remotely located workstation or interface device, including a wired or wireless device.

The gateway 200 includes a transaction message manager 208 to implement a transaction message transmission policy. The policy sets forth resource utilization limits according to a multiple-level hierarchy. The message manager 208 tracks message flow and system usage parameters according to multi-level identification information using limit counters 210 to ensure the amount of message traffic does not exceed predetermined message thresholds stored in limit table 212.

Any messages that would cause a threshold to be exceeded are preferably queued in transaction message queue 214. The transaction message queue is preferably stored in memory associated with the computing platform. The type of memory used may be any suitable memory, and is not limited to any particular type or structure. DRAM, RAM, FIFO buffers, FILO, etc. The storage mechanism may also take many forms, such as a database format, tables of software pointers, a linked list, a lookup table, etc. Further, the term "queue" refers to any suitable message storage and handling mechanism, and is not limited to a traditional first-in first-out queue. Rather, the stored messages in the queue are managed using the techniques set forth here. When the transaction message manager 208 receives a transaction message, it first checks to see whether it is related to any message that may have been placed in the queue. If the newly received transaction is related to a queued message, the queued message is updated to reflect the new information. A description of the queue management is set forth more fully below.

When an event occurs that causes any of the limit counters 210 to decrement, the transaction queue 214 is analyzed to determine whether any messages may be transmitted to the exchange. An example event that would cause a limit counter 210 to decrement is the passage of time with respect to a message threshold based on the number of messages allowed over a particular time frame. The transaction message manager will transmit a queued message to the exchange via the gateway processing unit 216 if doing so does not violate the messaging policy. It may also be desirable to queue messages received from the exchange into an out queue 218. One reason would be to conserve bandwidth between a trading workstation and a gateway. Further details of out queue 218 and aggregation of exchange messages may be found in the commonly assigned U.S. patent application Ser. No. 10/183,845, filed Jun. 26, 2002 in the name of Jens-Uwe Schluetter et al., entitled "System and Method for Coalescing Market Data at a Network Device," now U.S. Pat. No. 7,552,077, the contents of which are hereby incorporated by reference.

Figure 3:
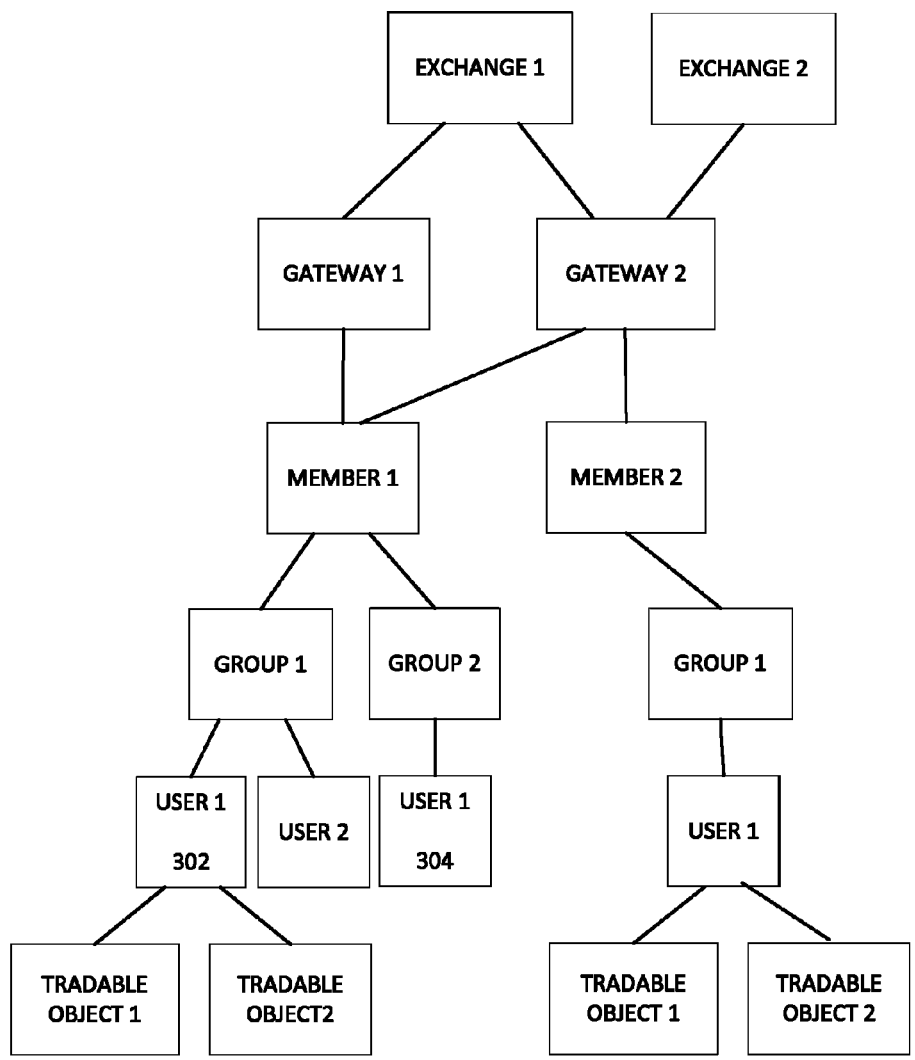
FIG. 3 is a preferred embodiment of a hierarchical grouping of traders.

With respect to FIG. 3, a multiple-level user identification hierarchy of a preferred embodiment will be described. Depicted in FIG. 3 are two exchanges, two gateways, two members, three groups, four users and four tradable objects. As used herein, the term "tradable object" refers simply to anything that can be traded with a quantity and/or price. It includes, but is not limited to, all types of tradable objects such as financial products, which can include, for example, stocks, options, bonds, futures, currency, and warrants, as well as funds, derivatives and collections of the foregoing, and all types of commodities, such as grains, energy, and metals. The tradable object may be "real", such as products that are listed by an exchange for trading, or "synthetic", such as a combination of real products that is created by the user.

More or fewer levels of user classification may be used, depending on the needs of the members and the dictates of the exchanges. The gateways and the exchanges may be interconnected using a many-to-one, one-to-many relationship. That is, multiple gateways may be connected to a single exchange, and a single gateway may be connected to multiple exchanges. The gateway device preferably monitors and manages all communications with the exchanges, and also serves to perform any message format translation, if necessary.

Similarly, multiple gateways may connect to a single member, and multiple members may connect to a single gateway. From the member level and below, each level is preferably related in a one-to-many relationship. That is, a single member entity may include one or more groups (and a group belongs to a single member), each group may include one or more users (and a user belongs to a single group), and each user may include one or more tradable objects (and a tradable object belongs to a single user). It should also be noted that limits may be based on classes or types of tradable objects. For example, futures and options are two types of tradable objects. An October 100 IBM call is a tradable object. Options related to IBM is class of tradable objects. Similarly, call options on IBM stock is another class of tradable objects that happens to be a subset of the general class of IBM options. October calls for IBM stock is another class of tradable objects that is a subset of the class of IBM call options.

Users sharing the same group level are preferably provided access to the transaction messages and trading activity of other users within the group. This may be desirable when a group of traders is working together to achieve a common goal (such as, e.g., hedging investments).

An individual user may also be subcategorized based on the software tools or applications that are being used. That is, a user (or administrator) may wish to separately monitor the transaction messaging relating to a particular trading application being used (e.g., an automated tool or a manual trading tool). In this particular case an entity may be defined as a single user's activities on a single trading tool. Alternatively, an entity may be defined to include all users or a subset of users that use the particular trading application.

As shown in FIG. 3, users are preferably grouped in a hierarchical manner, or tree structure, meaning that each user is uniquely identified by multiple identification parameters (preferably at least two) or entity parameters, specifying which entities they belong to, with the possibility that certain users share one or more identification parameters at a given entity level in the hierarchy. For example, USER 1 302, is identified by the 4-tuple: USER 1, GROUP 1, MEMBER 1, and GATEWAY 1. In contrast, USER 1 304 is identified by the 4-tuple USER 1, GROUP 2, MEMBER 1, and GATEWAY 1. Note also that each of USER 302, 304 may alternately be identified as being part of GATEWAY 2. Preferably, a user is designated as belonging to a specific gateway.

The identification levels depicted in FIG. 3 are one embodiment of an example identification hierarchy. Alternative embodiments may utilize more or fewer levels. For example, one embodiment may use only the user level. Another embodiment using only a single gateway may utilize only the user and tradable object levels. Additional levels such as account or software application may also be used. Furthermore, a user may be identified by a single unique name or number that may be translated, or mapped, into a corresponding unique multiple-level name designation. In one respect, this allows for more simplified messaging, in that the transaction messages from the trading stations 204 to the gateway 200 need not include all of the identification names or parameters in the hierarchy.

In a preferred embodiment, an administrator may select users, groups, or any other entity, and create a new entity containing the desired sets or subsets of pre-existing entities. This newly created entity may then be monitored and/or limited accordingly. In this way, the manner of providing a hierarchical arrangement of entities is flexible.

The gateway transaction message transmission policy is preferably implemented by ensuring the number or frequency of transaction messages transmitted to an exchange does not exceed message thresholds. The transaction message thresholds may be specified for each entity to ensure that transmission of a given transaction does not exceed the number of messages permitted for the entity. Limits for any particular entity may include such things as the number of messages per second (e.g., using a "sliding window" to count messages transmitted with the last second), the total number of transaction messages for the day, the number of transactions that are "in-flight" (transactions submitted to an exchange that have not yet been acknowledged by the exchange), the number of data bytes per second or the total number of bytes for the day. Numerous other types of limits may also be used, and the above are merely representative examples of useful limits.

With respect to FIGS. 4A-D, one embodiment of a graphical user interface (GUI) used for allocating the messaging resources is depicted. In table 400, all the entities associated with an exchange are displayed. Data fields are provided for an administrator to enter limit values (or formulas) based on the various entities. In FIG. 4A, the entities are identified by Member, Group, Trader, Tradable Object Type, and Tradable Object. The levels at which the entities may be limited are Gateway, Member, Group, and Trader. As can be seen in FIG. 4A, the "Member" entity contains four members: TTMBR, TT-TST, TTSIM, and TTTRN. In this embodiment, when an administrator types a value into any cell in the "MBR LIMIT" column, this value automatically propagates to all cells in that column corresponding to the same member value. Thus, for example, typing a "10" into the cell for any user belonging to the TTSIM Member entity will result in all the users belonging to the TTSIM Member entity to have a limit of 10 in-flight transactions. Similarly, in-flight limits may be specified for the entire gateway in the GATEWAY LIMIT column, and group and trader limits may be specified for individual traders in the TRDR LIMIT and GROUP LIMIT columns, respectively. Note that the trader identified as Trader 001 (trader entity), SIM (Group entity) and TTSIM (Membership entity) is listed three times, once for each of three separate tradable objects. These entries may correspond to three separate individuals, or may actually be the same person trading three separate tradable objects. In one preferred embodiment of FIG. 4A, the specified TRDR LIMIT applies to the cumulative messages for all product types, or it may act as a limit only to that tradable object, such that the trader's effective limit is the cumulative amount of all listed types and/or tradable objects. However, a further preferred embodiment would allow the limits for a given trader to be set at the trader level, and apply separate, non-cumulative limits at the product type and tradable object levels.

A provision for timeouts is also provided at the Gateway (GW T/O) and Member (MBR T/O) levels. Preferably, the time increment is specified in seconds. If a message has remained in the queue for the timeout period, the transaction message is preferably deleted from the queue, and the user is notified that the message has been deleted from the queue.

The TRDR FLOOR (Trader Floor) parameter indicates the number of transactions that are permitted without payment of additional fees. The TRDR FACTOR (Trader Factor) indicates the number of additional transactions that are permitted per fill. In a preferred embodiment, the Trader Floor and Trading Factor are used to dynamically configure the total transaction message limit for an entity. In a preferred embodiment, the total number of transactions is determined by either the Trader Floor parameter, or the Trading Factor multiplied by the number of fills, whichever is greater. In an alternative embodiment, the total number of transactions may equal the Trader floor parameter plus the Trader Factor times the number of fills. In other embodiments, alternative factors may be selected by an administrator, and combined in an appropriate manner. In the embodiment shown in FIG. 4A, the trader floor and factor levels are applied only to the tradable objects level of the transaction messages.

In one preferred embodiment, exceeding the total transaction limit will not result in the queuing of transaction messages. Rather, the trading entity or administrator is notified that the limit has been exceeded, and that further transaction messages may result in a fee.

FIGS. 4B-4D depict an example gateway status screen, a Trader status screen, and a Tradable Object status screen, respectively. The gateway screen of FIG. 4B preferably lists all gateways utilised in the system. The system preferably displays the number of transactions that are currently queued, the total number of messages that have been queued since the system was reset, the maximum number of messages queued at any given time, the current number of transactions in-flight, the total number of transaction messages sent since the system was last reset, the maximum number of messages that were in flight at a given time, and the number of in-flight messages that will result in an alarm (visual or audible, preferably to the administrator).

The screens of FIGS. 4C and 4D preferably contain any entity selected by an administrator. The entities may be selected from the exchange screen of FIG. 4A. Alternatively, entities may be automatically selected for display based on various criteria, which are preferably configurable by an administrator. For example, any entities that approach or exceed limits may be displayed, or any particularly active entities that do not presently have limits set may be displayed.

FIG. 4C displays the statistics for a selected trader. Specifically, the information displayed is the number of currently queued messages, the total number of messages that have been queued, the maximum number of messages queued at any given time, the current number of in-flight messages, and the maximum number of in-flight messages. FIG. 4D presents information including the type of object and the tradable object. The statistics include the total number of fills, the total fill ratio, the number of trader transactions and the number of trader fills.

FIGS. 4A-4D are one embodiment of the display and limit screens. These are presented herein as examples, and the screens and the particular information being shown may change depending on what limits are being followed, and other criteria determined by the intended use of the gateway system.

Figure 5:
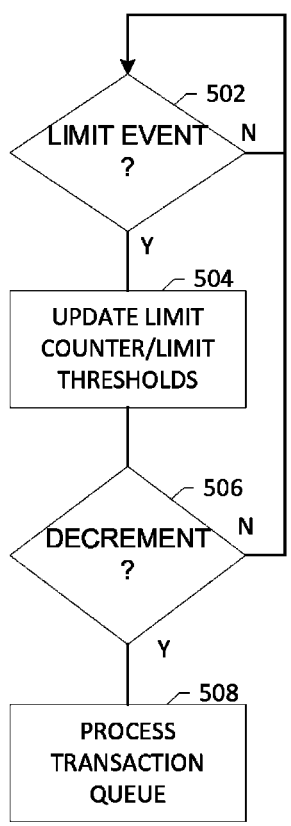
FIG. 5 is a preferred method of managing financial transaction messages.

With respect to FIG. 5, a preferred embodiment of managing financial transaction messages will be described. At block 502, the gateway 200 program determines whether a limiting event has occurred. If no limiting event occurs, the system waits for such an event. A limiting event may be any event that the system has been configured to track. For example, limiting events including transaction message transmissions, transaction message receipts, time lapses, etc. For in-flight transactions, a limiting event may include the transmission of a transaction to the exchange (causing an increment, or count up, to the number of in-flight transactions for the user), or the receipt of an order acknowledgement from the exchange (resulting in the appropriate counter being decremented, or counted down).

For limits relating to transactions per second (or other suitable time period), the relevant user counter is incremented when a transaction message is transmitted, and decremented as time lapses. Similarly, for data byte transmission rates, counters are increased based on transmissions, and decremented as time lapses. Preferably, the time-based counters are checked at a set time interval to determine whether a decrement should occur, thus the limiting event may be a timing signal. The time period may be configurable, and for example, may be in the 100's of milliseconds, but other values may be used. The selection of the time interval may be determined based on the overall system load, including the number of users be serviced, as well as other factors.

Further limit events may include the receipt of fills. That is, a system may be configured to adjust the total number of transactions permitted based on the number of fills At block 504, the appropriate counters are updated, or if appropriate, the limit threshold values may be revised. The counters include, but are not limited to, those for tracking total transaction messages and total byte transmission, transaction message transmission rates, data transmission rates, and in-flight transactions for any entity. Of course, each limiting event will typically result in the adjustment of counters at the various levels corresponding to the user's hierarchical designation or assignment, such as the user's group, account, gateway, or whatever entity applies, and which also may include counters for levels below the user, such as tradable object. As stated above, certain thresholds may also be adjusted.

At block 506, if any of the counters are decremented (or alternatively, if any thresholds are increased), then control is passed to block 508 to determine whether any queued messages may be transmitted. As discussed above, a worst-case logic is preferably utilized, which requires all applicable counts to be below the relevant thresholds before a queued transaction message is de-queued and sent to the exchange. If the counters are only incremented, then a further limiting event is awaited at block 502.

In the event that transmission of a given message to the exchange would exceed a threshold limit, the message is preferably placed in a transaction message queue until it may be transmitted without exceeding a threshold limit. The system automatically updates the queue when related messages are received from the trading workstation(s). The transaction message queue may also automatically drop messages if they remain in the queue for a predetermined (but configurable) length of time.

The system preferably notifies an administrator in the event of limits being enforced, resulting in queuing of transaction messages. The notification method is preferably configurable, and may include notification by email, instant messaging, paging, an on-screen message, or other suitable messaging system. In addition, the system preferably highlights the effected user(s) on the monitor screen so the administrator may easily identify the user. Whenever a user reaches a limit a notification is also preferably sent to the user's terminal.

Preferably, at any time the administrator may manually adjust any of the parameters to any of the entities at any level either before or after a limit is reached. This adjustment can preferably be done on the fly. A user is preferably notified whenever the user's limits are adjusted.

The transaction message manager 208 preferably maintains three sets of limit parameters in limit table 212: Default, Permanent, and Temporary. Any changes that are made are considered Temporary and will apply until the end of the current run (unless modified). At any time the administrator can save the current setting as the Permanent setting or restore either the Permanent setting or the Default setting. On invocation, the utility will use the Permanent setting. If a Permanent setting has not been saved then Default setting will be used.

When limit parameters are changed, they may be applied to queued messages, or they may be applied forward in time (such that they will not be used for transactions that are already in the message queue 214). Alternatively, the new limits may be applied to the queued messages. Whether the changes apply to queued messages may also be configurable by the administrator. The administrator is also able to set the parameter limits based on formulas to facilitate automatic limit adjustments. The formulas, which if present make up part of the transaction message transmission policy, may take into account logged users (by name and/or by number), exchange response times, network utilization, gateway utilization, other limits, status of other users, any measurement that is being monitored, combinations of limits, etc.

The system can be used with any formulas desired by the administrator. The gateway system 200 may provide predetermined formulas, but may also provide an interface to create new formulas. Still other embodiments have intelligence to automatically calculate and change the parameters. For example, parameters may be automatically increased or decreased to allow greater throughput if the system detects that the gateway's data lines to an exchange or that the exchange itself can support a greater number of messages. This detection can be done by various techniques known to those of ordinary skill in the art including by using pinging techniques or by querying routers regarding data line capacity.

As a result of reaching a limit, a user's requested transaction might have to be held in transaction message queue 214. When this occurs the user is preferably notified that the transaction status is Queued. The user will preferably be able to remove queued transaction by submitting a "Remove queued" transaction.

To ensure that very stale orders are not sent to the market place, each user preferably has a transaction timeout parameter that identifies the maximum amount of time that an order can wait in queue before it is rejected due to timeout. The timeout parameter preferably does not apply to delete order transactions. It may be preferable to delete an order late as compared to never, but the same may not be true for new or changed orders. In case the entity submits a second transaction related to a transaction in the queue then the following logic is applied in one embodiment to determine which transaction stays in the transaction message queue 214:

- The first delete for the transaction preferably stays in the queue and will preferably never be replaced. This avoids duplicate delete transactions. All subsequent related transactions will be rejected indicating that a delete is already in queue.
- A new change transaction will preferably replace an older change or cancel/replace transaction and be placed at the location of the older transaction in the queue. The older transaction will be rejected and the trader will preferably be notified.
- A new cancel/replace transaction will preferably replace an older change or cancel/replace transaction and will be placed at the end of the queue.

A "truth table" for a preferred embodiment of the invention for queuing a transaction in the message transaction queue 214 is shown in Table 1. This logic is preferably used whenever a limit is reached or if there is a transaction from the same entity in queue.

TABLE 1

| Trans. | Old | | |
|---|---|---|---|
| New Trans. | None | Delete | All other transactions |
| Add | Append new transaction to queue. | N/A | N/A |
| Delete | | New transaction rejected. | Old transaction replaced in queue by new transaction. |
| Change | | | |
| Cancel/Replace | | | Old transaction removed, new appended to queue. |
| Remove queued | User option | Old transaction removed from queue. | |
| Timeout | N/A | No action. | Old transaction rejected due to timeout. |

In Table 1, a New transaction (as specified in the first column of Table 1) refers to the transaction that is being processed, and an Old transaction (as specified in the first row of Table 1) refers to a related queued transaction. Thus, the treatment of a newly received transaction depends on whether any related transaction is already present in the queue. For example, with respect to the second row of Table 1, if the New transaction is an "Add" message (where Add refers to the first transaction related to a particular order), it will be appended to the queue if there is no prior (Old) related transaction. Additionally, because there should not be any "Delete" messages or any "other type" of messages that relate to a New "Add", Table 1 indicates that such a scenario is not applicable (N/A in Table 1).

If the New transaction is a "Delete" message, the queue management actions are indicated by the third row of Table 1. Specifically, a Delete message will be appended to the queue if there is no related message; it will be rejected if a prior related Delete message is already in the queue; and for any other type of related prior message, the new Delete message will replace the prior message in the queue. A new "Change" message will be handled in a manner similar to a new Delete. Likewise, a Cancel/Replace will be handled similarly, with the exception that if the related prior message is "any other type", then the Old transaction is removed and the new Cancel/Replace message will be appended to the queue (rather than taking the Old transaction's place within the queue).

Furthermore, as illustrated in Table 1, when the New transaction is a "Remove queued" and no related transaction message is in fact in the queue, then the user has the option (as specified by "User option" in Table 1) to either send a delete to the exchange or to have the "Remove queued" transaction rejected. Finally, the last row of Table 1 indicates that when a timeout occurs, the Old transaction is removed from the queue.

The administrator may modify the above rules, but it is preferred to maintain no more then one related transaction in the transaction message queue 214. Related transactions are transactions related to the same particular order, for example a buy order for a tradable object is related to a delete request for all or a part of that buy order. Preferably, each order has an identification parameter in its messages. In such an embodiment, two transactions are related if they have the same identifier. Preferably, the invention is configurable so that any type of transaction can or cannot be exempted from the queuing. Some example types of transactions include market orders, limit orders, stop orders, tradeouts (where a trader is trading out of all of his open positions), deletes, etc.

Furthermore, the gateway system is not limited to any particular message format. The system may be adapted for use with any messaging format having unique packet structures, various data fields, etc, including order identifier parameters, etc. Once the format of the packets is determined, then one of skill in the art may retrieve the necessary information to implement the message management system.

Since each entity has limits at each level and these limits can be different a "worst case" logic is preferably used for limit checking. That is, as soon as a limit is reached at any level, transactions will start queuing for all of the entities within that branch of the tree hierarchy.

An Example of an "In" queue in action is shown in Table 2, wherein a limit is set to 5 transactions per 1000 ms. For timing purposes, all transactions are considered to have occurred at 0 time into the millisecond. All transactions are from same "entity". The letter in the Transaction and Action columns represents a transaction identifier. To "de-queue" a message means to take a transaction out of the queue and process it (send it to the exchange).

TABLE 2

| Time | Transaction | Counter | Action | Reason |
|---|---|---|---|---|
| 0 | Submit A | 0 → 1 | To Exchange | Below limit, queue empty |
| 107 | Submit B | 1 → 2 | To Exchange | Below limit, queue empty |
| 214 | Submit C | 2 → 3 | To Exchange | Below limit, queue empty |
| 290 | Submit D | 3 → 4 | To Exchange | Below limit, queue empty |

TABLE 2-continued

| Time | Transaction | Counter | Action | Reason |
|---|---|---|---|---|
| 400 | Submit E | 4 → 5 | To Exchange | Below limit, queue empty |
| 401 | Submit F | 5 | Queue F | Limit reached |
| 550 | Submit G | 5 | Queue G | Limit reached |
| 633 | Change A (called A1) | 5 | Queue A1 | Limit reached |
| 650 | Submit H | 5 | Queue H | Limit reached |
| 750 | Delete A (called A2) | 5 | Queue A2 in place of A1 | Limit reached, truth table |
| 775 | Delete A (called A3) | 5 | Reject A3 | Limit reached, truth table |
| 1000 | Counter reduced | 4 → 5 | De-queue F | Below limit |
| 1033 | Submit I | 5 | Queue I | Limit reached |
| 1107 | Submit J & Counter reduced | 4 → 5 | Queue J, de-queue G | Transaction from same entity in queue, Below limit |
| 1214 | Counter reduced | 4 → 5 | De-queue A2 | Below limit |
| 1290 | Counter reduced | 4 → 5 | De-queue H | Below limit |
| 1400 | Counter reduced | 4 → 5 | De-queue I | Below limit |
| 2000 | Counter reduced | 4 → 5 | De-queue J | Below limit |
| 2107 | Counter reduced | 4 | None | Queue is empty |
| 2108 | Submit K | 4 → 5 | To Exchange | Below limit, queue empty |
| 2214 | Counter reduced | 4 | None | Queue is empty |
| 2290 | Counter reduced | 3 | None | Queue is empty |
| 2400 | Counter reduced | 2 | None | Queue is empty |
| 3000 | Counter reduced | 1 | None | Queue is empty |
| 3107 | Counter reduced | 0 | None | Queue is empty |

In alternative embodiments, other variations are provided. In one embodiment, added granularity is provided to enable different settings based on: transaction type, software application, tradable object, current P/L (profit/loss), Fills per sec, etc. In a further embodiment, the transactions may be prioritized in the queue based on factors such as: user, type, user associated parameters, or any of the items used for "added granularity" above. A further embodiment includes the ability to set or change limits based on historical results (previous half of day, yesterday, last week, etc.).

In the above description those skilled in the art will recognize that circuit elements in block diagrams and boundaries between logic blocks are merely illustrative and that alternative embodiments may merge logic blocks or functional elements or impose an alternate decomposition of functionality upon various logic blocks or elements. For example, the gateway processing may be performed prior to the transaction message queuing. Numerous other examples will be apparent to those of skill in the art.

While the invention has been described in connection with a number of exemplary embodiments, the foregoing is not intended to limit the scope of the invention to a particular form, circuit arrangement, or semiconductor topology. To the contrary, the invention is intended to be defined only by the appended claims and to include such alternatives, modifications and variations as may be apparent to those skilled in the art upon reading the foregoing detailed description.

What is claimed:

1. A method including:
receiving by a computing device a transaction message from a trading workstation, wherein the transaction message is associated with an entity, wherein the transaction message is for a tradable object, wherein the entity is specified by a subset of a plurality of identification parameters, wherein the plurality of identification parameters is arranged in a hierarchy including one or more tradable object identification parameters associated with each of one or more trader identification parameters, wherein the subset of identification parameters specifying the entity includes a trader identification parameter and an associated tradable object identification parameter, wherein the entity is one of a plurality of entities associated with transaction messages provided to the computing device, wherein each of the plurality of entities is specified by a different subset of the plurality of identification parameters;

determining by the computing device that a limit associated with the entity would be exceeded by sending the transaction message to a matching process, wherein the limit is based on the number of transaction messages associated with the entity, wherein the matching process matches incoming transaction messages, wherein the incoming transaction messages are prioritized according to a time when the incoming transaction messages are received at the matching process;

queuing by the computing device the transaction message when the limit associated with the entity would be exceeded, wherein queuing the transaction message results in the received transaction message losing time priority at the matching process if the transaction message is later sent to the matching process;

receiving by the computing device a second transaction message related to the queued transaction message;

updating by the computing device the queued transaction message based on the received second transaction message;

determining by the computing device that the queued transaction message should be sent to the matching process based on the limit; and sending by the computing device the updated queued transaction message to the matching process when the limit associated with the entity would not be exceeded.

2. The method of claim 1, wherein the transaction message is an order.

3. The method of claim 1, wherein the subset of identification parameters specifying the entity includes identification parameters associated with a plurality of users.

4. The method of claim 1, wherein the subset of identification parameters specifying the entity includes an identification parameter associated with a particular software product.

5. The method of claim 1, wherein the limit is based on a number of in-flight transaction messages.

6. The method of claim 1, wherein the limit is based on a number of transaction messages for the computing device.

7. The method of claim 1, wherein the limit is automatically modified in response to a number of fills.

8. The method of claim 1, wherein the limit is automatically modified in response to a measure of profitability.

9. The method of claim 1, wherein the queued transaction message is an order message and the second transaction message is a delete message relating to the order message, and wherein updating the queued transaction message includes replacing the order message with the delete message.

10. The method of claim 1, wherein the queued transaction message is an order message and the second transaction message is a cancel-replace message related to the order message, and wherein updating the queued transaction message includes removing the order message and placing the cancel-replace message in the queue.

11. A non-transitory computer readable medium having stored therein instructions executable by a processor, wherein the instructions are executable to:

receive a transaction message from a trading workstation, wherein the transaction message is associated with an entity, wherein the transaction message is for a tradable object, wherein the entity is specified by a subset of a plurality of identification parameters, wherein the plurality of identification parameters is arranged in a hierarchy including one or more tradable object identification parameters associated with each of one or more trader identification parameters, wherein the subset of identification parameters specifying the entity includes a trader identification parameter and an associated tradable object identification parameter, wherein the entity is one of a plurality of entities associated with transaction messages provided to a computing device including the processor, wherein each of the plurality of entities is specified by a different subset of the plurality of identification parameters;

determine that a limit associated with the entity would be exceeded by sending the transaction message to a matching process, wherein the limit is based on the number of transaction messages associated with the entity, wherein the matching process matches incoming transaction messages, wherein the incoming transaction messages are prioritized according to a time when the incoming transaction messages are received at the matching process;

queue the transaction message when the limit associated with the entity would be exceeded, wherein queuing the transaction message results in the received transaction message losing time priority at the matching process if the transaction message is later sent to the matching process;

receive a second transaction message related to the queued transaction message;

update the queued transaction message based on the received second transaction message;

determine that the queued transaction message should be sent to the matching process based on the limit; and send the updated queued transaction message to the matching process when the limit associated with the entity would not be exceeded.

12. The computer readable medium of claim 11, wherein the transaction message is an order.

13. The computer readable medium of claim 11, wherein the subset of identification parameters specifying the entity includes identification parameters associated with a plurality of users.

14. The computer readable medium of claim 11, wherein the subset of identification parameters specifying the entity includes an identification parameter associated with a particular software product.

15. The computer readable medium of claim 11, wherein the limit is based on a number of in-flight transaction messages.

16. The computer readable medium of claim 11, wherein the limit is based on a number of transaction messages for the computing device.

17. The computer readable medium of claim 11, wherein the limit is automatically modified in response to a number of fills.

18. The computer readable medium of claim 11, wherein the limit is automatically modified in response to a measure of profitability.

19. The computer readable medium of claim 11, wherein the queued transaction message is an order message and the second transaction message is a delete message relating to the order message, and wherein updating the queued transaction message includes replacing the order message with the delete message.

20. The computer readable medium of claim 11, wherein the queued transaction message is an order message and the second transaction message is a cancel-replace message related to the order message, and wherein updating the queued transaction message includes removing the order message and placing the cancel-replace message in the queue.

* * * * *